No. 708,935. Patented Sept. 9, 1902.
E. H. STRANGE & E. GRAHAM.
MANUFACTURE OF VARNISHES.
(Application filed Apr. 21, 1902.)
(No Model.)
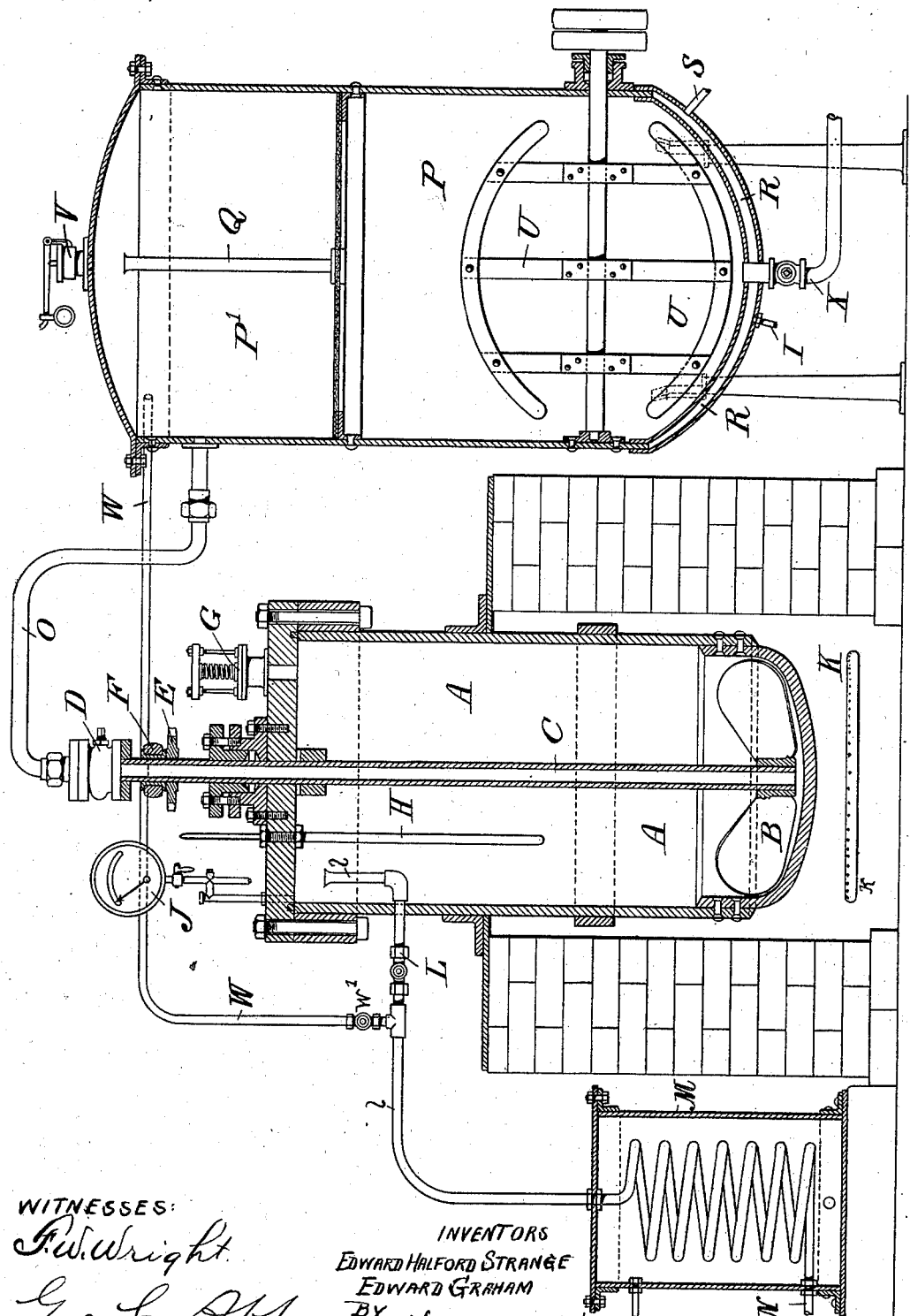
WITNESSES:
F. W. Wright.
Geo. C. Abbe.
INVENTORS
EDWARD HALFORD STRANGE
EDWARD GRAHAM
BY Howson and Howson
HIS ATTORNEYS.
THE NORRIS PETERS CO., PHOTO-LITHO., WASHINGTON, D. C.

UNITED STATES PATENT OFFICE.

EDWARD HALFORD STRANGE, OF LONDON, AND EDWARD GRAHAM, OF TILEHURST, ENGLAND, ASSIGNORS OF ONE-HALF TO EDMUND RISOLIÈRE BURRELL, OF MILWALL, LONDON, ENGLAND.

MANUFACTURE OF VARNISHES.

SPECIFICATION forming part of Letters Patent No. 708,935, dated September 9, 1902.

Application filed April 21, 1902. Serial No. 104,045. (No specimens.)

*To all whom it may concern:*

Be it known that we, EDWARD HALFORD STRANGE, M.Sc., chemist, residing at 15 Maida Vale, London, and EDWARD GRAHAM, M. Sc., chemist, residing at Highcroft, Tilehurst, in the county of Berks, England, subjects of the King of Great Britain and Ireland, have invented certain new and useful Improvements in the Manufacture of Varnishes; and we do hereby declare the following to be a full, clear, and exact description of the invention, such as will enable others skilled in the art to which it appertains to make and use the same.

This invention relates to the manufacture of varnishes wherein a gum or resin or gums or resins and a non-volatile drying-oil—such, for example, as linseed-oil—and also turpentine suitable for varnish-making are employed with or without driers, hard gums or resins being used—that is, gums or resins which we find require in practice the turpentine employed to be heated to a temperature above its boiling-point in order to dissolve the said gum or resin or gums or resins; and the object of this invention is to conduct the manufacture in a manner such that economy in both materials and time is effected and a better product is obtained, the process according to this invention enabling clear and pale varnishes ready for immediate or almost immediate use to be manufactured expeditiously, safely, and without loss of the materials employed or without any considerable loss of such materials.

The sectional view in the accompanying drawing illustrates one form of apparatus in which our improved process may be carried out.

In the ordinary mode of manufacture of what are known as "oil-varnishes" when a hard gum or resin—such, for example, as Zanzibar copal—is employed it is melted in an open vessel and then mixed with hot linseed-oil and afterward is mixed with turpentine, driers, if such be used, being added. The melting of the gum or resin is attended by considerable loss and evolution of deleterious vapors, and if a clear varnish be required it is necessary to allow the product to stand for a long period in order that impurities may settle out. It has been proposed to heat all the ingredients together in a closed vessel, and it has also been proposed to heat together in a closed vessel the gum or resin and the linseed or like oil and afterward to add the turpentine and driers. In such modes of manufacture, however, if a temperature sufficiently high to prevent the ingredients afterward separating be employed the oil and the gum or resin are decomposed or affected in such a manner as to cause discoloration of the product, and, moreover, the product is not in a condition in which it can be readily filtered. According to this invention we overcome these objections by carrying out the manufacture as follows: We introduce the gum or resin or gums or resins and the turpentine into a vessel capable of being closed, preferably employing an excess of the turpentine, and we subject the contents of the vessel to an elevated temperature, preferably one of from about 300° to about 350° centigrade. We preferably stir the materials during the heating, and at the end of the operation allow a small proportion of the turpentine to distil off in order to carry off any water which may be present. The turpentine so distilled off can be condensed for reuse. A solution of the gum or resin or gums or resins in the turpentine is thus obtained of a character which will allow solid impurities to readily settle therefrom or which can be readily passed through a filter for the separation of the said solid impurities. Any excess of turpentine is then distilled off and recovered, and the oil, such as linseed-oil, (preferably heated to a temperature not exceeding 100° centigrade,) is mixed therewith. Should driers be required in the varnishes, they are by preference added to the linseed or like oil before mixing it with the solution of gum or resin or gums or resins in turpentine, but the said driers may be added at any other convenient stage.

The mixture described (with or without driers) forms a varnish which may be used immediately or almost immediately. It is clear and pale as the gum or resin or gums or resins has or have not been subjected to objectionable partial destructive distillation and suspended matter and water have been removed and prolonged storage is rendered unnecessary. A great advantage of the possibility of readily filtering the solution of gum or resin or gums or resins in turpentine is that it enables gum or resin in dust or small particles, with which impurities are often present, to be used in the manufacture with satisfactory results.

The following is an example of the manner in which this invention can be carried out in practice; but we do not limit ourselves to the precise details of this example. The parts are by weight.

We take one part of Zanzibar copal and four parts of turpentine and introduce them into a vessel capable of being closed and of withstanding a working pressure of from thirty to forty atmospheres and provided with a stirrer and also with means for heating it, which may be gas, superheated steam, or any convenient way of applying the requisite temperature. The materials are stirred in the vessel while they are subjected to a temperature of from about 300° to 350° centigrade until the copal is dissolved. A small proportion of the turpentine is then allowed to distill off through a pipe provided with a valve which is opened for the purpose, the said pipe leading to a condenser in which the turpentine so distilled off is recovered. The thin solution of the copal in the turpentine is then passed from the aforesaid vessel through a filter, by which it is cleared of solid impurities which may be present. The excess of turpentine is then distilled off and condensed for reuse. The temperature of the solution is then lowered to such a degree that it will not cause discoloration of linseed-oil, and then two parts of linseed-oil heated to a temperature not exceeding 100° centigrade are mixed and thoroughly stirred with the solution. If driers be used, they are preferably added to the linseed-oil before it is added to the solution, the quantity of driers varying in accordance with the speed of drying required.

Many different forms of apparatus may be used in carrying out our invention; but for the better understanding of the process hereinbefore described we have shown in the accompanying drawing one form of apparatus adapted to be used to produce varnish by our method.

A is the high-pressure digester, provided with a hollow shaft C, open near the bottom of the vessel and carrying agitator-blades B. This shaft passes through a stuffing-box in the cover of the vessel, and its upper end terminates in a valve D. A worm-wheel E or other means may be provided to rotate the shaft C. A thermometer H, a safety-valve G, and a pressure-gage J may be provided in the vessel. A pipe $l$ opens to the upper part of the vessel and passes outside of the vessel in the form of a coil in a condenser M. This pipe $l$ has a valve L. Heat is applied to the vessel by burners $k$ or the like in the fireplace K.

The low-pressure filter and mixing-pan P has an agitator U and an outlet-valve X in its lower portion and is connected at its upper portion with the valve D by the pipe O and also with the condenser-coil by the pipe W, a valve W' being provided in the pipe W. A filter P', having an air-pipe Q, is placed in the upper part of the chamber P. A steam-jacket R may be placed at the lower end of the chamber P to maintain the mixture at the proper heat.

In operation the chamber A is filled with the copal, turpentine, and drier, if one be used, heated to the desired temperature with the chamber closed, and stirred at the same time. When the materials have become thoroughly mixed and digested, the valve L is opened, which allows the volatilized turpentine and moisture carried with it to pass out through the pipe $l$ to the condenser M, so that the turpentine may be saved for future use. During the revolution of the shaft C the pipe O is disconnected; but the pipe O is now connected up to valve D. The valve L being now closed, the valve D is opened, whereupon the composition is forced up through the hollow shaft C to the filter P', through which it readily filters owing to the excess of turpentine which it contains. Valve D may now be closed and the valve W' opened, so that the volatilized turpentine will pass out through the pipe W to the condenser M until the composition has been sufficiently freed of the excess of turpentine, when the linseed-oil may be mixed with the aforesaid composition within the vessel P and the finished product drawn off through the valve X.

Having now particularly described and ascertained the nature of this invention and in what manner the same is to be performed, we declare that what we claim is—

1. The manufacture of varnishes in which hard gum, or resin, a non-volatile drying-oil, and turpentine are employed, by first dissolving the gum, or resin, in an excess of turpentine in a closed vessel at a temperature sufficiently high to dissolve the hard gum, or resin, employed, then filtering, or settling, solid impurities from the solution, then distilling off the excess of turpentine and afterward mixing the non-volatile drying-oil with the solution at a temperature lower than that at which turpentine would be evaporated; substantially as hereinbefore described.

2. The manufacture of varnishes, in which hard gum, or resin, a non-volatile drying-oil and turpentine are employed by first dissolving the gum, or resin, in an excess of turpentine in a closed vessel at a temperature of or about 300° to 350° centigrade, then filtering, or settling, the solution to remove solid impurities, then distilling off excess of turpentine, and afterward mixing the non-volatile drying-oil with the solution at a temperature not exceeding 100° centigrade; substantially as hereinbefore described.

3. The manufacture of varnishes, in which hard gum, or resin, a non-volatile drying-oil and turpentine are employed, by first dissolving the gum, or resin, in an excess of turpentine in a closed vessel at a temperature sufficiently high to dissolve the hard gum, or resin, then distilling off a portion of the turpentine to carry off water, then filtering or settling, out solid impurities then distilling off the excess of turpentine, and afterward mixing the non-volatile drying-oil with the solution at a temperature lower than would cause discoloration of the non-volatile drying-oil, or the evaporation of the turpentine; substantially as hereinbefore described.

In testimony whereof we affix our signatures in the presence of two witnesses.

EDWARD HALFORD STRANGE.
EDWARD GRAHAM.

Witnesses:
WILLIAM IDEN WEEKS,
HENRY DENIS HOSKINS.